US011970658B2

(12) United States Patent
Shumway et al.

(10) Patent No.: US 11,970,658 B2
(45) Date of Patent: Apr. 30, 2024

(54) LOW DENSITY HYDRATE INHIBITIVE FLUIDS

(71) Applicant: Halliburton Energy Services, Inc., Houston, TX (US)

(72) Inventors: William Walter Shumway, Spring, TX (US); Jay Paul Deville, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/649,895

(22) PCT Filed: May 17, 2019

(86) PCT No.: PCT/US2019/032894
§ 371 (c)(1),
(2) Date: Mar. 23, 2020

(87) PCT Pub. No.: WO2020/236137
PCT Pub. Date: Nov. 26, 2020

(65) Prior Publication Data
US 2021/0115323 A1 Apr. 22, 2021

(51) Int. Cl.
*C09K 8/536* (2006.01)
*C09K 8/32* (2006.01)

(52) U.S. Cl.
CPC ............... *C09K 8/536* (2013.01); *C09K 8/32* (2013.01); *C09K 2208/22* (2013.01)

(58) Field of Classification Search
CPC ... C09K 8/02; C09K 8/03; C09K 8/04; C09K 8/06; C09K 8/08; C09K 8/16; C09K 8/26; C09K 8/265; C09K 8/28; C09K 8/32; C09K 8/34; C09K 8/36; C09K 8/52; C09K 8/524; C09K 8/528; C09K 8/536; C09K 2208/22; C09K 2208/34
See application file for complete search history.

(56) References Cited

U.S. PATENT DOCUMENTS

| | | | |
|---|---|---|---|
| 3,977,472 A | 8/1976 | Graham et al. | |
| 7,855,168 B2 | 12/2010 | Fuller et al. | |
| 9,790,104 B2 * | 10/2017 | Anderson | B01D 17/0214 |
| 10,696,801 B2 * | 6/2020 | Wood | C09K 8/52 |
| 2003/0092584 A1 * | 5/2003 | Crews | C09K 8/685 507/200 |
| 2006/0027369 A1 | 2/2006 | Baycroft et al. | |
| 2007/0281868 A1 * | 12/2007 | Pauls | C09K 8/76 507/213 |
| 2010/0099807 A1 * | 4/2010 | Carlise | C10L 3/003 524/376 |
| 2010/0227781 A1 * | 9/2010 | Tej | C09K 8/08 507/140 |
| 2011/0308625 A1 * | 12/2011 | Stoisits | F17D 3/14 137/1 |
| 2013/0098623 A1 * | 4/2013 | Spencer | C09K 8/52 526/260 |
| 2013/0175046 A1 * | 7/2013 | Morrison | C10L 3/107 166/369 |
| 2014/0172177 A1 * | 6/2014 | Jamison | G01V 8/02 700/281 |
| 2020/0231888 A1 * | 7/2020 | Karas | C10L 3/103 |

FOREIGN PATENT DOCUMENTS

| | | | |
|---|---|---|---|
| CN | 1757965 A | 4/2006 | |
| CN | 107312513 A * | 11/2017 | |
| WO | 2011/109118 A1 | 9/2011 | |
| WO | WO-2011109118 A1 * | 9/2011 | ............... C09K 8/52 |

OTHER PUBLICATIONS

Translation of CN 107312513 A (Year: 2017).*
International Search Report and Written Opinion issued in related PCT Application No. PCT/US2019/032894 dated Feb. 11, 2020, 12 pages.
International Preliminary Report on Patentability issued in related PCT Application No. PCT/US2019/032894 dated Dec. 2, 2021, 9 pages.

* cited by examiner

*Primary Examiner* — Angela M DiTrani Leff
(74) *Attorney, Agent, or Firm* — Thomas Rooney; C. Tumey Law Group PLLC

(57) ABSTRACT

Methods and compositions for use in the inhibition of the formation of gas hydrate agglomerates are provided. In some embodiments, a method is provided that includes: providing an emulsion drilling fluid including: a continuous phase including a non-oleaginous fluid; an internal phase including an oleaginous fluid; and a thermodynamic hydrate inhibitor; and drilling at least a portion of a wellbore penetrating a subterranean formation.

12 Claims, 1 Drawing Sheet

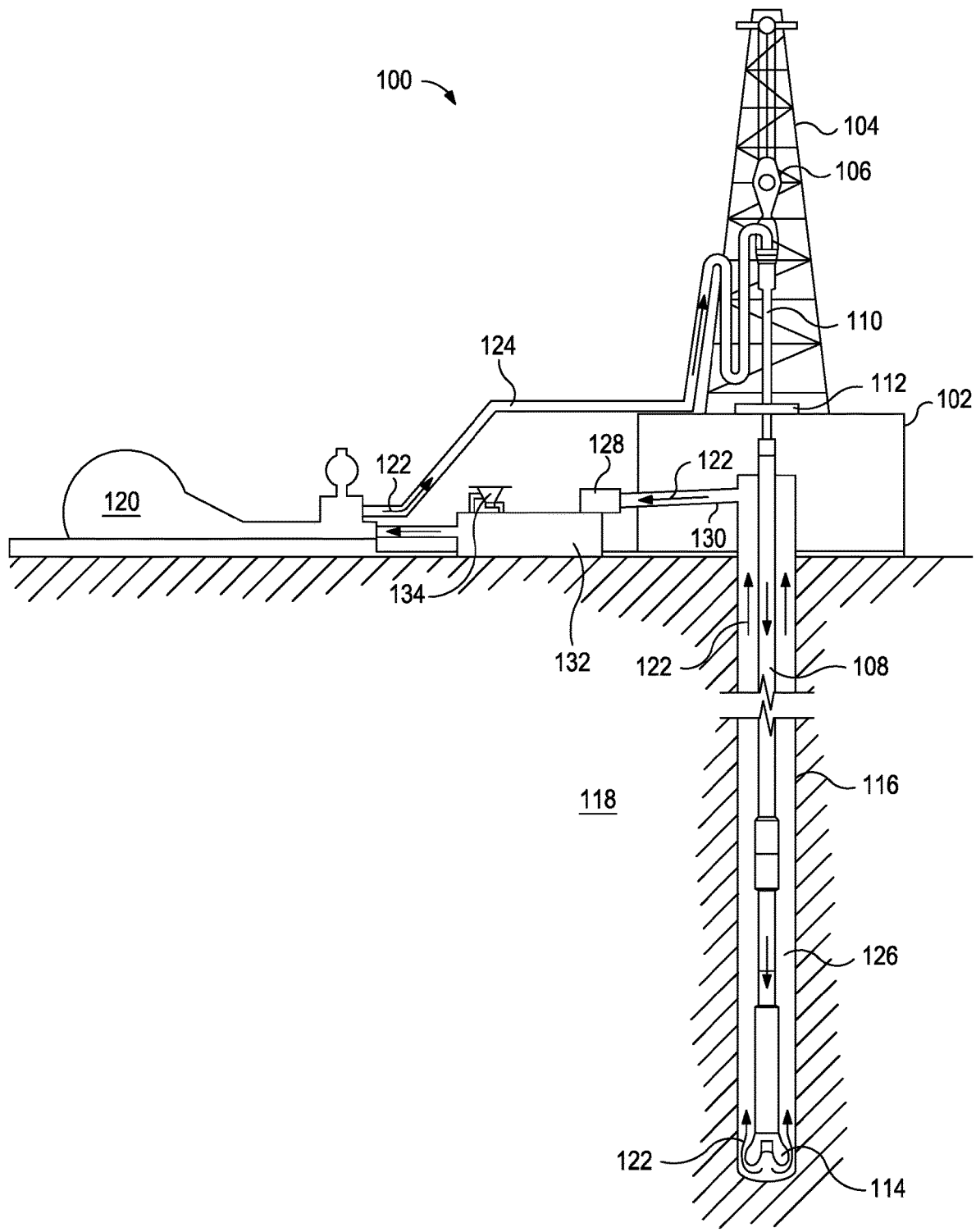

LOW DENSITY HYDRATE INHIBITIVE FLUIDS

CROSS-REFERENCE TO RELATED APPLICATION

The present application is a U.S. National Stage Application of International Application No. PCT/US2019/032894 filed May 17, 2019, which is incorporated herein by reference in its entirety for all purposes.

BACKGROUND

The present disclosure relates to compositions and methods for treating subterranean formations. More particularly, the present disclosure relates to compositions and the use of such compositions, for example, for inhibiting the formation of gas hydrate agglomerates.

Treatment fluids can be used in a variety of subterranean treatment operations. As used herein, the terms ""treat,"" ""treatment,"" ""treating,"" and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like.

Gas hydrates may be solids that may agglomerate in a fluid that is flowing or is substantially stationary, under certain temperature and pressure conditions. For example, gas hydrates may form during hydrocarbon production from a subterranean formation, in particular in pipelines and other equipment during production operations. Gas hydrates may impede or completely block flow of hydrocarbons or other fluid flowing through such pipelines. These blockages not only may decrease or stop production, potentially costing millions of dollars in lost production, but also may be very difficult and dangerous to mediate. Unless properly handled, gas hydrates may be volatile and/or explosive, potentially rupturing pipelines, damaging equipment, endangering workers, and/or causing environmental harm. Gas hydrates may form when water molecules become bonded together after coming into contact with certain ""guest"" gas or liquid molecules. Hydrogen bonding causes the water molecules to form a regular lattice structure, like a cage, that is stabilized by the guest gas or liquid molecules entrapped within the lattice structure. The resulting crystalline structure may precipitate as a solid gas hydrate. Guest molecules can include any number of molecules such as, for example, carbon dioxide, methane, butane, propane, hydrogen, helium, freon, halogen, a noble gas, and the like.

BRIEF DESCRIPTION OF THE DRAWINGS

These drawings illustrate certain aspects of some of the embodiments of the present disclosure and should not be used to limit or define the claims.

The FIGURE is an elevation view of an example of a drilling system in accordance with certain While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure involving wellbores may be applicable to horizontal, vertical, deviated, or otherwise nonlinear wellbores in any type of subterranean formation. Embodiments may be applicable to injection wells, monitoring wells, and production wells, including hydrocarbon or geothermal wells.

Gas hydrates may include crystalline inclusion compounds of gas molecules in water which form under certain temperature and pressure conditions (e.g., low temperature and high pressure). The water molecules may form cage structures around the appropriate gas molecules. The lattice structure formed from the water molecules may be thermodynamically unstable and may be stabilized by the incorporation of gas molecules. Depending on pressure and gas composition, these ice-like compounds may exist even above the freezing point of water, or in some instances, above about 77° F.

In the crude oil and natural gas industry, gas hydrates may form from water and the natural gas constituents methane, ethane, propane, isobutane, n-butane, nitrogen, carbon dioxide and hydrogen sulfide. These gas hydrates may cause problems for oil and gas operations, especially when wet gas or multiphasic mixtures of water, gas and alkane mixtures are subjected to low temperatures under high pressure. As a consequence of their insolubility and crystalline structure, the formation of gas hydrates may lead to the blockage of a wide variety of equipment such as pipelines, valves, and drilling or production equipment.

Hydrate inhibitors may be grouped into three general classes: thermodynamic, kinetic, and anti-agglomerate hydrate inhibitors. Thermodynamic hydrate inhibitors may operate by shifting the hydrate formation phase boundary of a treatment fluid away from temperature and pressure conditions of a process by increasing the driving force required for formation of the hydrate. Kinetic hydrate inhibitors may prevent or delay the nucleation of hydrates, thus limiting hydrate crystal size and growth. Anti-agglomerate hydrate inhibitors may prevent or otherwise disrupt the agglomeration of hydrates. Thermodynamic hydrate inhibitors may require high concentrations to be effective. For example, thermodynamic hydrate inhibitors may be unsuitable in many treatment fluids because the amount of thermodynamic hydrate inhibitors required to sufficiently inhibit the formation of gas hydrates may result in an increase in the density of the treatment fluid. Many treatment fluids may be designed to have specific properties, including a specific"

density values or a specific density value range. The addition of suitable quantities of thermodynamic hydrate inhibitors may raise the density above the desired density value or density value range.

The present disclosure relates to compositions and methods for treating subterranean formations. More particularly, the present disclosure relates to compositions and the use of such compositions, for example, for inhibiting the formation of gas hydrate agglomerates.

The present disclosure provides compositions and methods for using a treatment fluid that includes an emulsion and one or more thermodynamic hydrate inhibitors in the drilling, completing and working over of subterranean wells, e.g., oil and gas wells. As used herein, the term "emulsion" refers to a dispersion of two immiscible liquids (e.g., an aqueous phase and an oil phase) having a continuous phase and a dispersed or internal phase. The interfacial tension between an oleaginous fluid (oil phase) and a non-oleaginous fluid (aqueous phase) may often be high. Thus, if the liquids are mixed together they may spontaneously separate from each other when the agitation ceases, to minimize the interfacial area. Lowering the interfacial tension with an emulsifier may enable one liquid to form a stable dispersion of fine droplets in the other. The lower the interfacial tension, the smaller the droplets may be and the more stable the emulsion may become. In one or more embodiments, the emulsion treatment fluids of the present disclosure may include an oleaginous fluid as the dispersed phase and a non-oleaginous fluid as the continuous phase. In particular, the present disclosure provides an emulsion treatment fluid that includes an oleaginous fluid, a non-oleaginous fluid, and a thermodynamic hydrate inhibitor.

Among the many potential advantages to the methods and compositions of the present disclosure, only some of which are alluded to herein, the methods and compositions of the present disclosure may provide treatment fluids that include thermodynamic hydrate inhibitors that also have a density within desirable ranges for wellbore treatment operations. Without limiting the disclosure to any particular theory or mechanism, it is believed that the use of emulsions in the compositions and methods of the present disclosure may allow the treatment fluids to use thermodynamic hydrate inhibitors at a concentration sufficient to at least partially inhibit gas hydrate formation without having a substantial impact on the density of the treatment fluid. For example, in some embodiments, the treatment fluids of the present disclosure may include a concentration of thermodynamic hydrate inhibitors of greater than about 10% by weight, based on the weight of the continuous phase of the treatment fluid. In other embodiments, the concentration of thermodynamic hydrate inhibitors may be greater than about 25% by weight, based on the weight of the continuous phase of the treatment fluid. In other embodiments, the concentration of thermodynamic hydrate inhibitors may be greater than about 32% by weight, based on the weight of the continuous phase of the treatment fluid. In other embodiments, the concentration of thermodynamic hydrate inhibitors may be greater than about 44% by weight, based on the weight of the continuous phase of the treatment fluid. In still other embodiments, the concentration of thermodynamic hydrate inhibitors may be greater than about 50% by weight, based on the weight of the continuous phase of the treatment fluid.

As discussed above, in one or more embodiments, the thermodynamic hydrate inhibitors used in the treatment fluids of the present disclosure may shift the hydrate formation phase boundary of the treatment fluid. In certain embodiments, the thermodynamic hydrate inhibitors may lower the temperature at which gas hydrates form. For example, in some embodiments, the thermodynamic hydrate inhibitors may lower the temperature at which gas hydrates form by about 5° F. or more. In other embodiments, the thermodynamic hydrate inhibitors may lower the temperature at which gas hydrates form by about 10° F. or more. In other embodiments, the thermodynamic hydrate inhibitors may lower the temperature at which gas hydrates form by about 25° F. or more. In still other embodiments, the thermodynamic hydrate inhibitors may lower the temperature at which gas hydrates form by about 50° F. or more. In certain embodiments, the thermodynamic hydrate inhibitors may raise the pressure at which gas hydrates form. For example, in some embodiments, the thermodynamic hydrate inhibitors may raise the pressure at which gas hydrates form by about 100 psi or more. In other embodiments, the thermodynamic hydrate inhibitors may raise the pressure at which gas hydrates form by about 1000 psi or more. In other embodiments, the thermodynamic hydrate inhibitors may raise the pressure at which gas hydrates form by about 5000 psi or more. In still other embodiments, the thermodynamic hydrate inhibitors may raise the pressure at which gas hydrates form by about 10,000 psi or more. In one or more embodiments, the thermodynamic hydrate inhibitors may raise or lower both the temperature and the pressure at which gas hydrates form. Accordingly, in certain embodiments, the thermodynamic hydrate inhibitors used in the treatment fluids of the present disclosure may be selected to shift the hydrate formation phase boundary away from the expected or actual temperature and pressure conditions expected to be encountered during a particular treatment operation. For example, in some embodiments, the hydrate formation phase boundary may be shifted away from the temperature and pressure conditions within a wellbore penetrating at least a portion of a subterranean formation.

In one or more embodiments, the thermodynamic hydrate inhibitors used in the treatment fluids of the present disclosure may be or include any suitable thermodynamic hydrate inhibitor that may at least partially reduce the tendency for gas hydrate formation in the treatment fluids. For example, in certain embodiments, the thermodynamic hydrate inhibitors of the present disclosure may be selected from the group consisting of a salt, alcohols, glycols, polyols, any derivative thereof, and any combination thereof. In some embodiments, the thermodynamic hydrate inhibitor may be a divalent salt. In one or more embodiments where the thermodynamic hydrate inhibitor may be a divalent salt, the divalent salt may be present in an amount greater than the amount naturally occurring in the non-oleaginous fluid used to form the treatment fluids of the present disclosure. For example, in some embodiments, the divalent salt may be present in the treatment fluids in an amount greater than about 5% by weight. In certain embodiments, the thermodynamic hydrate inhibitor may be a calcium salt. In some embodiments, the calcium salt may be selected from the group consisting of calcium chloride, calcium bromide, calcium nitrate, calcium phosphate, calcium fluoride, and calcium iodide. In other embodiments, the thermodynamic hydrate inhibitor may be monoethylene glycol. In other embodiments, the thermodynamic hydrate inhibitor may be methanol. In still other embodiments, the thermodynamic hydrate inhibitor may be one or more polyalkylene glycols.

Without intending to be limited to any particular theory or mechanism, it is believed that the oleaginous internal phase of the emulsion may lower the density of the treatment fluid, thereby allowing the addition of greater concentrations of thermodynamic hydrate inhibitors while still staying within a desired density range. For example, in some embodiments, the treatment fluids of the present disclosure may include a density in the range of from about 6.5 to about 12 lb/gal. In other embodiments, the treatment fluids may include a density in the range of from about 7.5 to about 12 lb/gal. In other embodiments, the treatment fluids may include a density in the range of from about 8 to about 11 lb/gal. In other embodiments, the treatment fluids may include a density in the range of from about 8 to about 11 lb/gal. In other embodiments, the treatment fluids may include a density in the range of from about 8 to about 10.5 lb/gal. In still other embodiments, the treatment fluids of the present disclosure may include a density in the range of from about 9 to about 10.5 lb/gal.

In one or more embodiments, the treatment fluids of the present disclosure may be useful in the drilling, completion and working over of subterranean oil and gas wells. For example, in some embodiments, the treatment fluids of the present disclosure may be useful in formulating drilling muds or completion fluids that facilitate removal of a filter cake from a subterranean formation or wellbore. Such muds and fluids may be especially useful in drilling horizontal wells into hydrocarbon bearing formations. Any known method may be used to prepare the treatment fluids of the present disclosure in a manner analogous to those normally used to prepare conventional emulsion treatment fluids. In some embodiments, a desired quantity of oleaginous fluid such as a base oil and a suitable amount of emulsifier may be mixed together and the remaining components (e.g., the non-oleaginous fluid) may be added sequentially with continuous mixing. In some embodiments, an emulsion of the present disclosure may be formed by vigorously agitating, mixing, or shearing the oleaginous fluid and the non-oleaginous fluid.

In one or more embodiments, the non-oleaginous fluid in the treatment fluids of the present disclosure may be a liquid such as an aqueous liquid. For example, in certain embodiments, the non-oleaginous liquid may be selected from the group including water, sea water, a brine containing organic and/or inorganic dissolved salts, liquids containing water-miscible organic compounds and combinations thereof. In some embodiments, the non-oleaginous liquid may be an aqueous liquid that is not sea water or a brine. In some embodiments, the concentration of the non-oleaginous fluid should be sufficient so that an emulsion forms and may be less than about 99% by volume of the emulsion. In some embodiments, the non-oleaginous fluid may be present in the treatment fluid in an amount of from about 30% to about 99% by volume. In some embodiments, the non-oleaginous fluid may be present in the treatment fluid in an amount of from about 40% to about 95%. In some embodiments, the non-oleaginous fluid may be present in the treatment fluid in an amount of from about 50% to about 90%. In some embodiments, the non-oleaginous fluid may be present in the treatment fluid in an amount of from about 60% to about 90%. In some embodiments, the non-oleaginous fluid may be present in the treatment fluid in an amount of from about 70% to about 90%.

In one or more embodiments, the oleaginous fluid used in the treatment fluids of the present disclosure may be a natural or synthetic oil, or a mixture thereof. In certain embodiments, the oleaginous fluid may be selected from the group including crude oil, diesel oil; mineral oil; a natural oil, such as refined paraffin or vegetable oil; a synthetic oil, such as polyolefins, synthetic paraffins, esters, alpha-olefins, internal olefins, polydiorganosiloxanes, siloxanes, or organosiloxanes; and mixtures thereof. In some embodiments the amount of the oleaginous fluid may be less than the theoretical limit needed for forming an emulsion. In some embodiments, the oleaginous fluid is present in an amount of less that about 70% by volume of the emulsion treatment fluid. In some embodiments, the oleaginous fluid is present in an amount of from about 1% to about 70% by volume of the emulsion treatment fluid. In some embodiments, the oleaginous fluid is present in an amount of from about 5% to about 60% by volume of the emulsion treatment fluid. In some embodiments, the oleaginous fluid is present in an amount of from about 10% to about 50% by volume of the emulsion treatment fluid. In some embodiments, the oleaginous fluid is present in an amount of from about 10% to about 40% by volume of the emulsion treatment fluid. In one or more embodiments, the desired percentage of the oleaginous fluid present in the treatment fluids of the present disclosure may be determined based on a desired final density of the emulsion treatment fluid.

In certain embodiments, the treatment fluids of the present disclosure may include one or more emulsifiers that may at least partially lower the interfacial tension of the liquids so that the oleaginous fluid may form an at least partially stable dispersion of fine droplets in the non-oleaginous liquid. In some embodiments, the emulsifier may be or include one or more surfactants. For example, in some embodiments, the emulsifier may be an amine surfactant. In other embodiments, the emulsifier may be a quaternary ammonium surfactant. In still other embodiments, the emulsifier may be sorbitan-based. In one or more embodiments, the emulsifier may be present in the treatment fluids of the present disclosure in an amount of from about 0.1 to about 15 lb/bbl. In some embodiments, the emulsifier may be present in an amount of from about 0.5 to about 10 lb/bbl. In other embodiments, the emulsifier may be present in an amount of from about 1 to about 5 lb/bbl.

In some embodiments, the treatment fluids of the present disclosure may further include one or more anti-agglomerate hydrate inhibitors. Without intending to be limited to any particular theory or mechanism, it is believed that the treatment fluids of the present disclosure may facilitate the use of anti-agglomerate hydrate inhibitors within the oleaginous fluid of the emulsion. In one or more embodiments, the anti-agglomerate hydrate inhibitors may operate at the boundary of the oleaginous fluid and the non-oleaginous fluid to at least partially prevent or reduce the agglomeration of gas hydrates within the treatment fluid. In some embodiments, the anti-agglomerate hydrate inhibitors used in the treatment fluids of the present disclosure also may act as an emulsifier. For example, in one or more embodiments, the anti-agglomerate hydrate inhibitors of the present disclosure may at least partially lower the interfacial tension between the oil phase and the water phase of the treatment fluid. In certain embodiments, the anti-agglomerate hydrate inhibitors may be the only emulsifier used in the treatment fluids of the present disclosure. In other embodiments, the anti-agglomerate hydrate inhibitors may be used with one or more additional emulsifiers in the treatment fluids of the present disclosure. In some embodiments, the anti-agglomerate hydrate inhibitors used with the treatment fluids of the present disclosure may be quaternary ammonium or phosphonium surfactants. In other embodiments, the anti-agglomerate hydrate inhibitors used with the treatment fluids of the present disclosure may be betaine or amine oxide surfactants. In some embodiments, the anti-agglomerate hydrate inhibitors may be present in the treatment fluids in an amount of from about 0.1 to about 25 wt. % of the treatment fluid. In other embodiments, the anti-agglomerate hydrate inhibitors may be present in the treatment fluids in an amount of from about 0.5 to about 20 wt. % of the treatment fluid. In still other embodiments, the anti-agglomerate hydrate inhibitors may be present in the treatment fluids in an amount of from about 1 to about 15 wt. % of the treatment fluid.

In certain embodiments, the treatment fluids used in the methods and systems of the present disclosure optionally may include any number of additional additives. Examples of such additional additives include, but are not limited to, salts, surfactants, acids, proppant particulates, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, $H_2S$ scavengers, $CO_2$ scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol), and the like. In certain embodiments, one or more of these additional additives (e.g., a crosslinking agent) may be added to the treatment fluid and/or activated after a viscosifying agent has been at least partially hydrated in the fluid. A person skilled in the art, with the benefit of this disclosure, will recognize the types of additives that may be included in the fluids of the present disclosure for a particular application.

The treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the thermodynamic hydrate inhibitors of the present disclosure and/or other components of the treatment fluid may be metered directly into a base treatment fluid to form a treatment fluid. In certain embodiments, the base fluid may be mixed with the additives of the present disclosure and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

The present disclosure in some embodiments provides methods for using the treatment fluids to carry out a variety of subterranean treatments, including but not limited to, hydraulic fracturing treatments, acidizing treatments, and drilling operations. In some embodiments, the treatment fluids of the present disclosure may be used as a drilling fluid in drilling at least a portion of a wellbore to penetrate at least a portion of a subterranean formation. In certain embodiments, a treatment fluid may be introduced into a subterranean formation. In certain embodiments, the treatment fluid may be introduced into a wellbore that penetrates a subterranean formation.

The fluids disclosed herein may directly or indirectly affect one or more components or pieces of equipment associated with the preparation, delivery, recapture, recycling, reuse, and/or disposal of the disclosed additives and fluids. For example, and with reference to the FIGURE, the disclosed fluids may directly or indirectly affect one or more components or pieces of equipment associated with an example of a wellbore drilling assembly 100, according to some embodiments. It should be noted that while the FIGURE generally depicts a land-based drilling assembly, those skilled in the art will readily recognize that the principles described herein are equally applicable to subsea drilling operations that employ floating or sea-based platforms and rigs, without departing from the scope of the disclosure. For example, in some embodiments, the methods and systems of the present disclosure may be used on offshore platforms, drill ships, semi-submersibles, and/or drilling barges. In some embodiments, the treatment fluid may be introduced into a subsea wellbore that penetrates a subterranean formation.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed additives (e.g., thermodynamic hydrate inhibitors) may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed additives may be added to the drilling fluid 122 at any other location in the drilling assembly 100. In some embodiments, for example, there could be more than one retention pit 132, such as multiple retention pits 132 in series. Moreover, the retention pit 132 may be representative of one or more fluid storage facilities and/or units where the disclosed additives may be stored, reconditioned, and/or regulated until added to the drilling fluid 122.

As mentioned above, the disclosed treatment fluids and additives may directly or indirectly affect the components and equipment of the drilling assembly 100. For example, the disclosed fluids and additives may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, or the like. The fluid processing unit(s) 128 may further include one or more sensors, gauges, pumps, compressors, and the like used store, monitor, regulate, and/or recondition the fluids.

The disclosed fluids and/or additives may directly or indirectly affect the pump 120, which representatively includes any conduits, pipelines, trucks, tubulars, and/or pipes used to fluidically convey the fluids and/or additives downhole, any pumps, compressors, or motors (e.g., topside or downhole) used to drive the fluids and/or additives into motion, any valves or related joints used to regulate the pressure or flow rate of the fluids and/or additives, and any sensors (i.e., pressure, temperature, flow rate, etc.), gauges, and/or combinations thereof, and the like. The disclosed fluids and/or additives may also directly or indirectly affect the mixing hopper 134 and the retention pit 132 and their assorted variations.

The disclosed fluids and/or additives may also directly or indirectly affect the various downhole equipment and tools that may come into contact with the fluids and/or additives such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed fluids and/or additives may also directly or indirectly affect any downhole heat exchangers, valves and corresponding actuation devices, tool seals, packers and other wellbore isolation devices or components, and the like associated with the wellbore 116. The disclosed fluids and/or additives may also directly or indirectly affect the drill bit 114, which may include, but is not limited to, roller cone bits, PDC bits, natural diamond bits, any hole openers, reamers, coring bits, etc.

While not specifically illustrated herein, the disclosed fluids and/or additives may also directly or indirectly affect any transport or delivery equipment used to convey the fluids and/or additives to the drilling assembly 100 such as, for example, any transport vessels, conduits, pipelines, trucks, tubulars, and/or pipes used to fluidically move the fluids and/or additives from one location to another, any pumps, compressors, or motors used to drive the fluids and/or additives into motion, any valves or related joints used to regulate the pressure or flow rate of the fluids and/or additives, and any sensors (i.e., pressure and temperature), gauges, and/or combinations thereof, and the like.

An embodiment of the present disclosure is a method that includes: providing an emulsion treatment fluid including a continuous phase including a non-oleaginous fluid; an internal phase including an oleaginous fluid; and a thermodynamic hydrate inhibitor; and introducing the treatment fluid into a wellbore penetrating at least a portion of a subterranean formation.

In one or more embodiments described in the preceding paragraph, the method further includes allowing the thermodynamic hydrate inhibitor to shift a hydrate formation phase boundary of the treatment fluid. In one or more embodiments described above, the step of allowing the thermodynamic hydrate inhibitor to shift the hydrate formation phase boundary of the emulsion treatment fluid further includes raising or lowering at least one of a temperature or a pressure at which gas hydrates begin to form in the emulsion treatment fluid. In one or more embodiments described above, the step of raising or lowering at least one of the temperature or the pressure at which gas hydrates begin to form in the emulsion treatment fluid further includes lowering the temperature at which gas hydrates begin to form in the emulsion treatment fluid by at least 5° F. In one or more embodiments described above, the step of raising or lowering at least one of the temperature or the pressure at which gas hydrates begin to form in the emulsion treatment fluid further includes raising the pressure at which gas hydrates begin to form in the emulsion treatment fluid by at least 100 psi. In one or more embodiments described above, the thermodynamic hydrate inhibitor is selected from the group consisting of: a divalent salt, monoethylene glycol, a polyakylene glycol, methanol, any derivative thereof, and any combination thereof. In one or more embodiments described above, the wellbore is a subsea wellbore. In one or more embodiments described above, the thermodynamic hydrate inhibitor is a divalent salt present in the treatment fluid in an amount greater than about 5% by weight of the treatment fluid. In one or more embodiments described above, the emulsion treatment fluid further includes an anti-agglomerate hydrate inhibitor. In one or more embodiments described above, the anti-agglomerate hydrate inhibitor is selected from the group consisting of: a quaternary ammonium surfactant, a phosphonium surfactant, a betaine surfactant, an amine oxide surfactant, any derivative thereof, and any combination thereof.

Another embodiment of the present disclosure is an emulsion treatment fluid that includes: a continuous phase including a non-oleaginous fluid; an internal phase including an oleaginous fluid; and a thermodynamic hydrate inhibitor.

In one or more embodiments described in the preceding paragraph, the thermodynamic hydrate inhibitor is selected from the group consisting of: a divalent salt, monoethylene glycol, a polyakylene glycol, methanol, any derivative thereof, or any combination thereof. In one or more embodiments described above, the thermodynamic hydrate inhibitor is a calcium salt. In one or more embodiments described above, the internal phase further includes an anti-agglomerate hydrate inhibitor. In one or more embodiments described above, the anti-agglomerate hydrate inhibitor is selected from the group consisting of: a quaternary ammonium surfactant, a phosphonium surfactant, a betaine surfactant, an amine oxide surfactant, any derivative thereof, and any combination thereof.

Another embodiment of the present disclosure is a method that includes: providing an emulsion drilling fluid including: a continuous phase including a non-oleaginous fluid; an internal phase including an oleaginous fluid; and a thermodynamic hydrate inhibitor; and drilling at least a portion of a wellbore penetrating a subterranean formation.

In one or more embodiments described in the preceding paragraph, the method further includes allowing the thermodynamic hydrate inhibitor to shift a hydrate formation phase boundary of the emulsion treatment fluid. In one or more embodiments described above, the wellbore is a subsea wellbore. In one or more embodiments described above, the thermodynamic hydrate inhibitor is selected from the group consisting of: a divalent salt, monoethylene glycol, a polyakylene glycol, methanol, any derivative thereof, and any combination thereof. In one or more embodiments described above, the internal phase further includes an anti-agglomerate hydrate inhibitor.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   providing an emulsion treatment fluid comprising:
   a continuous phase comprising a non-oleaginous fluid;
   an internal phase comprising an oleaginous fluid;
   one or more anti-agglomerate hydrate inhibitors; and
   a thermodynamic hydrate inhibitor comprising a divalent salt present in the treatment fluid in an amount greater than about 44% by weight, based on the weight of the continuous phase of the treatment fluid; and
   introducing the treatment fluid into a well bore penetrating at least a portion of a subterranean formation, wherein the density of the treatment fluid is in the range of from about 8 to about 10.5 lb/gal.

2. The method of claim 1 further comprising allowing the thermodynamic hydrate inhibitor to shift a hydrate formation phase boundary of the emulsion treatment fluid.

3. The method of claim 2, wherein the step of allowing the thermodynamic hydrate inhibitor to shift the hydrate formation phase boundary of the emulsion treatment fluid further comprises raising or lowering at least one of a temperature or a pressure at which gas hydrates begin to form in the emulsion treatment fluid.

4. The method of claim 3, wherein raising or lowering at least one of the temperature or the pressure at which gas hydrates begin to form in the emulsion treatment fluid further comprises lowering the temperature at which gas hydrates begin to form in the emulsion treatment fluid by about 5° F. to about 50° F.

5. The method of claim 3, wherein raising or lowering at least one of the temperature or the pressure at which gas hydrates begin to form in the emulsion treatment fluid further comprises raising the pressure at which gas hydrates begin to form in the emulsion treatment fluid by about 100 psi to about 10,000 psi.

6. The method of claim 1, wherein the wellbore is a subsea wellbore.

7. The method of claim 1, wherein the anti-agglomerate hydrate inhibitor is selected from the group consisting of: a quaternary ammonium surfactant, a phosphonium surfactant, a betaine surfactant, an amine oxide surfactant, any derivative thereof, and any combination thereof.

8. The method of claim 1, wherein the anti-agglomerate hydrate inhibitor is present in an amount of about 1 wt. % to 25 wt. % of the treatment fluid.

9. The method of claim 1, wherein the anti-agglomerate hydrate inhibitor comprises phosphonium surfactant.

10. A method comprising:
    providing an emulsion drilling fluid comprising:
    a continuous phase comprising a non-oleaginous fluid;
    an internal phase comprising an oleaginous fluid;
    one or more anti-agglomerate hydrate inhibitors; and
    a thermodynamic hydrate inhibitor comprising a divalent salt present in the treatment fluid in an amount greater than about 44% by weight, based on the weight of the continuous phase of the treatment fluid, wherein the density of the treatment fluid is in the range of from about 8 to about 10.5 lb/gal;
    using the drilling fluid to drill at least a portion of a well bore penetrating at least a portion of a subterranean formation.

11. The method of claim 10 further comprising allowing the thermodynamic hydrate inhibitor to shift a hydrate formation phase boundary of the emulsion drilling fluid.

12. The method of claim 10, wherein the wellbore is a subsea wellbore.

* * * * *